US009508314B2

(12) United States Patent
Tomofuji

(10) Patent No.: US 9,508,314 B2
(45) Date of Patent: Nov. 29, 2016

(54) ELECTRONIC EQUIPMENT AND IMAGE FORMING APPARATUS

(71) Applicant: KYOCERA Document Solutions Inc., Osaka (JP)

(72) Inventor: Shinji Tomofuji, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/854,060

(22) Filed: Sep. 15, 2015

(65) Prior Publication Data

US 2016/0086569 A1   Mar. 24, 2016

(30) Foreign Application Priority Data

Sep. 22, 2014 (JP) ................... 2014-192520

(51) Int. Cl.
| | |
|---|---|
| G06F 15/00 | (2006.01) |
| G09G 5/00 | (2006.01) |
| H04N 1/00 | (2006.01) |
| G09G 3/20 | (2006.01) |
| G09G 3/36 | (2006.01) |

(52) U.S. Cl.
CPC ............ *G09G 5/006* (2013.01); *G09G 3/20* (2013.01); *H04N 1/001* (2013.01); *H04N 1/0032* (2013.01); *H04N 1/00129* (2013.01); *G09G 3/2096* (2013.01); *G09G 3/3611* (2013.01); *G09G 2330/06* (2013.01); *G09G 2370/04* (2013.01); *G09G 2370/08* (2013.01); *H04N 2201/0093* (2013.01)

(58) Field of Classification Search
CPC ........ G09G 5/006; G09G 3/20; H04N 1/001; H04N 1/00129; H04N 1/0032
USPC ......................................... 358/1.15
See application file for complete search history.

(56) References Cited

U.S. PATENT DOCUMENTS

| | | | |
|---|---|---|---|
| 2008/0197918 A1* | 8/2008 | Narushima | ............ H04B 1/719 327/551 |
| 2011/0228284 A1* | 9/2011 | Ohmine | ............. G06K 15/1894 358/1.1 |
| 2013/0069895 A1* | 3/2013 | Lo | ......................... G06F 3/0416 345/173 |

FOREIGN PATENT DOCUMENTS

JP        2012133677 A       7/2012

* cited by examiner

*Primary Examiner* — Mark Milia

(57) ABSTRACT

An electronic equipment includes a control unit, an EMI frequency storage unit, and a settable range detection unit. The EMI frequency storage unit stores respective frequencies of EMI noise components in ones of driving pulse signals, which are transmitted from the control unit to other modules than a display module in association with the other modules. The settable range detection unit detects a settable range of the frequency of one of the driving pulse signals, which is transmitted from the control unit to the display unit. When transmitting the driving pulse signal to the display module, the control unit sets, as the frequency of the driving pulse signal to the display module, a frequency that is a frequency excluding the frequencies of the EMI noise components stored in association with the other modules that are being driven and also is a frequency in the settable range that has been detected.

2 Claims, 5 Drawing Sheets

ELECTRONIC EQUIPMENT AND IMAGE FORMING APPARATUS

INCORPORATION BY REFERENCE

The disclosure of Japanese Patent Application No. 2014-192520 filed on Sep. 22, 2014, including the specification, drawings and abstract is incorporated herein by reference in its entirety.

BACKGROUND

This disclosure relates to an electronic equipment including a display unit that is driven in accordance with a drive signal and an image forming apparatus.

A general image forming apparatus includes modules, such as a scanner, a FAX, a local area network (LAN) interface, a universal serial bus (USB) memory interface, and the like, and each of the modules is a cause for the generation of electromagnetic interference (EMI) radiation noise. As an image forming apparatus of this type, there is an image forming apparatus configured such that an operation unit includes a liquid crystal display (LCD) and an LCD controller, and the LCD controller transmits an LCD clock signal, an LCD data signal, and the like to the LCD, so that an image is displayed on the LCD. Note that the LCD clock signal is also a cause for the generation of EMI radiation noise.

SUMMARY

According to an aspect of the present disclosure, an electronic equipment includes a plurality of modules including a display module, a control unit, an electromagnetic interference (EMI) frequency storage unit, and a settable range detection unit. The control unit transmits a corresponding driving pulse signal to each of the plurality of modules. The EMI frequency storage unit stores respective frequencies of EMI noise components in ones of the driving pulse signals, which are transmitted from the control unit to the other modules than the display module in association with the other modules. The settable range detection unit detects a settable range of the frequency of one of the driving pulse signals, which is transmitted from the control unit to the display module. When the control unit transmits the driving pulse signal to the display module, the control unit sets, as the frequency of the driving pulse signal to the display module, a frequency that is a frequency excluding the frequencies of the EMI noise components stored in association with the other modules that are being driven and also is a frequency in the settable range that has been detected.

DETAILED DESCRIPTION

An electronic equipment and an image forming apparatus according to an embodiment of the present disclosure will be described below with reference to the accompanying drawings.

Figure 1:
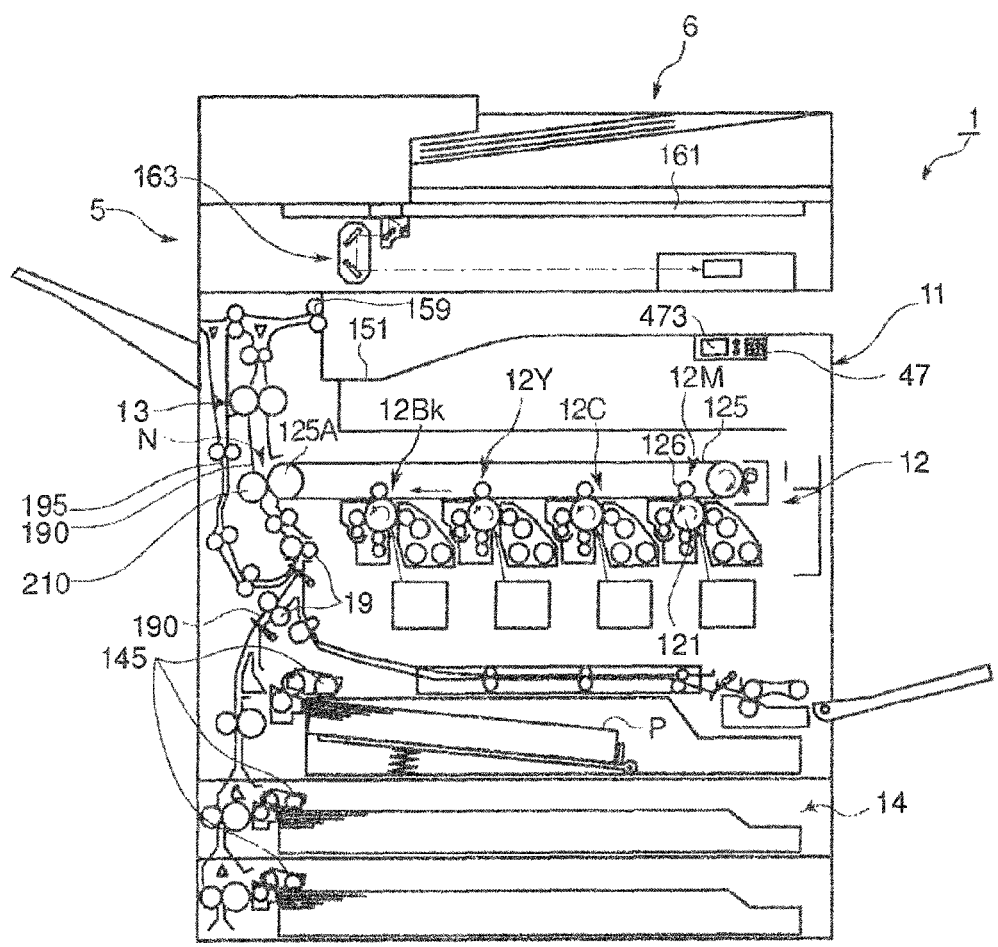
FIG. 1 is a front cross-sectional view illustrating a configuration of an image forming apparatus according to an embodiment of the present disclosure.

FIG. 1 is a front cross-sectional view illustrating a configuration of an image forming apparatus according to an embodiment of the present disclosure. An image forming apparatus 1 that is an example of an electronic equipment according to an embodiment of the present disclosure is, for example, a multifunction peripheral having a plurality of functions, such as a copy function, a printer function, a scanner function, and a facsimile function. The image forming apparatus 1 is configured such that an apparatus body 11 includes an image forming unit 12, a fixing unit 13, a paper feeding unit 14, an original document feeding unit 6, a scanner 5, and the like. The apparatus body 11 includes a main control unit 100 (FIG. 2), a nonvolatile memory 101 (FIG. 2), and a settable range detection unit 102 (FIG. 2), and an operation unit 47 is removably coupled to the apparatus body 11. Note that the apparatus body 11 is an example of an electronic equipment body in the scope of claims.

Figure 3:
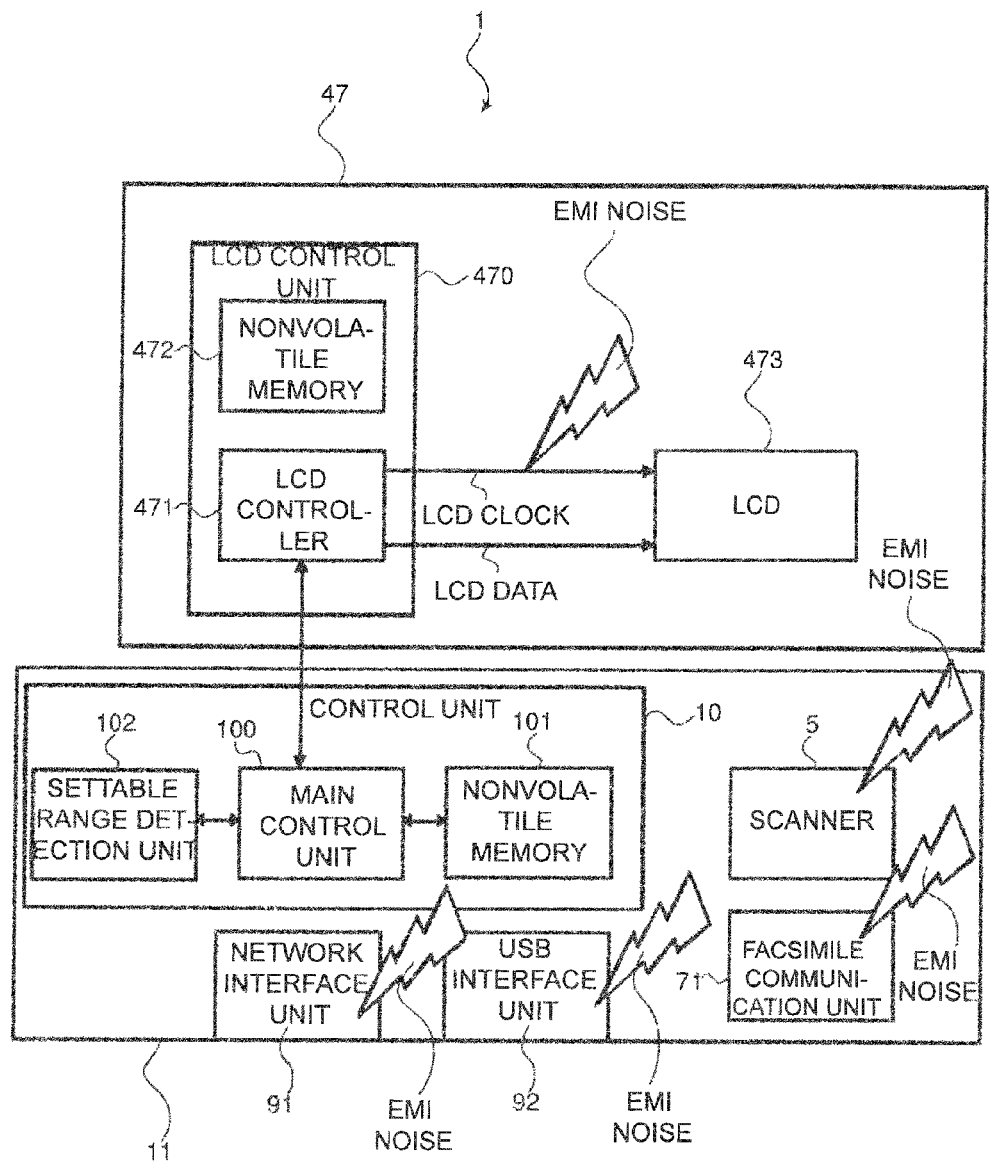
FIG. 3 is a diagram illustrating how EMI noise is generated from each module.

The operation unit 47 receives an instruction, such as an image forming operation execution instruction, an original document read operation execution instruction, and the like, from an operator for various kinds of operations and processing that may be executed by the image forming apparatus 1. Note that the operation unit 47 is an example of an operation module in the scope of claims. The operation unit 47 includes a liquid crystal display (LCD) 473 configured to display an operation guide or the like to the operator. Note that the LCD 473 is an example of a display module in the scope of claims. The operation unit 47 further includes an LCD control unit 470 (FIG. 3). Note that the LCD control unit 470 will be described later in detail with reference to FIG. 3.

When the image forming apparatus 1 performs an original document read operation, the scanner 5 optically reads an image of an original document fed by the original document feeding unit 6 or an original document placed on an original document platen glass 161, and generates image data. Image data generated by the scanner 5 is stored in a built-in HDD, a computer coupled to a network, or the like.

When the image forming apparatus 1 performs an image forming operation, based on image data generated by an original document read operation, image data received from the computer coupled to the network, image data stored in the built-in HDD, or the like, the image forming unit 12 forms a toner image on a recording paper P as a recording medium that is fed from the paper feeding unit 14. When color printing is performed, each of an image forming unit 12M for magenta, an image forming unit 12C for cyan, an image forming unit 12Y for yellow, and an image forming unit 12Bk for black forms, based on an image made of a corresponding color component forming image data, a toner image on a photoreceptor drum 121 by steps of charging, exposure, and development, and transfers the toner image on an intermediate transfer belt 125 with a primary transfer roller 126.

For the toner images of different colors that are transferred on the intermediate transfer belt 125, a transfer timing thereof is adjusted, and then, the toner images are superimposed on the intermediate transfer belt 125 to form a color toner image. A secondary transfer roller 210 transfers the color toner image formed on a surface of the intermediate transfer belt 125 on the recording paper P conveyed from the paper feeding unit 14 through a conveyance path 190 with the intermediate transfer belt 125 interposed therebetween in a nip portion N between the secondary transfer roller 210 and a driving roller 125A. Thereafter, the fixing unit 13 fixes the toner image transferred on the recording paper P on the recording paper P by thermocompression. The recording paper P on which the color image has been formed and fixing processing is completed is discharged to a paper discharge tray 151.

The paper feeding unit 14 includes a plurality of paper feeding cassettes. The main control unit 100 (FIG. 2) rotation-drives pickup rollers 145 of the paper feeding cassettes in which recording paper sheets of a size designated by an instruction by an operator, and causes conveyance of the recording paper P stored in the corresponding one of the paper feeding cassettes toward the nip portion N.

Note that, in the image forming apparatus 1, when double side printing is performed, the recording paper P with one surface on which an image is formed by the image forming unit 12 is nipped by a discharge roller pair 159, and then, the recording paper P is switched back by the discharge roller pair 159, is sent to an inverting and conveying unit 195, and is conveyed again, by a conveyance roller pair 19, to an upstream area relative to the nip portion N and the fixing unit 13 in a conveyance direction in which the recording paper P is conveyed. Thus, an image is formed on the other surface of the recording paper P by the image forming unit 12.

Figure 2:
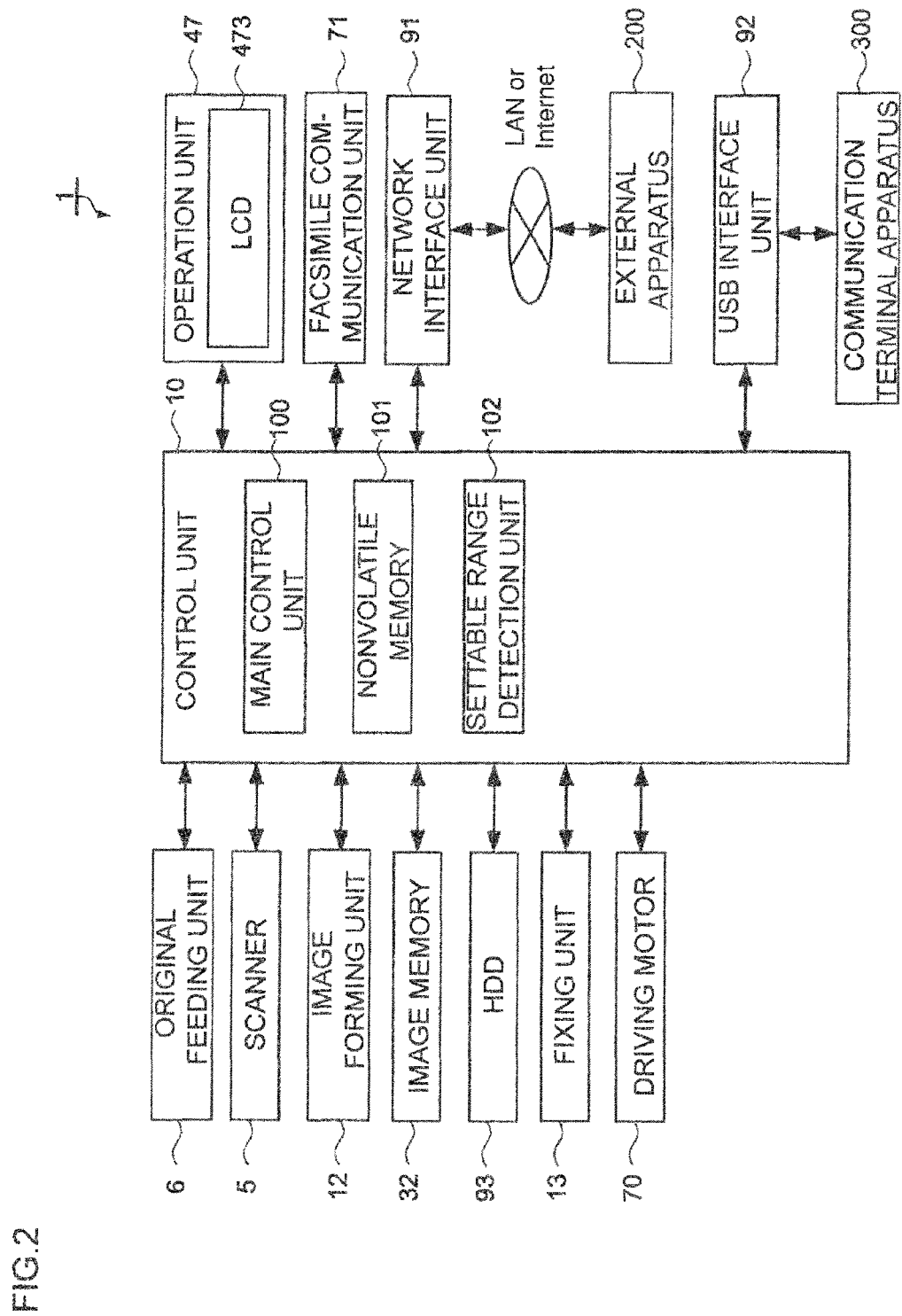
FIG. 2 is a functional block diagram illustrating a major internal configuration of the image forming apparatus.

FIG. 2 is a functional block diagram illustrating a major internal configuration of the image forming apparatus 1. The image forming apparatus 1 includes, a control unit 10, the original document feeding unit 6, the scanner 5, the image forming unit 12, an image memory 32, an HDD 93, the fixing unit 13, a driving motor 70, the operation unit 47, a facsimile communication unit 71, a network interface unit 91, a USB interface unit 92, and the like. Note that a part which is the same as the corresponding part described in FIG. 1 is denoted by the same reference character as that of the corresponding part, and the description thereof will be omitted.

The scanner 5 includes a read mechanism 163 (FIG. 1) including a light irradiation unit, a CCD sensor, and the like, under control performed by the main control unit 100 included in the control unit 10. The scanner 5 irradiates light to an original document with the light irradiation unit, receives reflected light thereof with the CCD sensor, and thereby reads an image from the original document. Note that the scanner 5 is an example of the other modules in the scope of claims.

The image memory 32 is an area in which data of an original document obtained by reading performed by the scanner 5 is temporarily stored and data that is a print target of the image forming unit 12 is temporarily saved.

The HDD 93 is a large capacity storage device that stores an original image and the like read by the scanner 5.

The driving motor 70 is a driving source that gives rotation driving force to each rotary member of the image forming unit 12, the conveyance roller pair 19, and the like.

The facsimile communication unit 71 includes a coding/decoding unit, a modulation unit, and a network control unit (NCU), which are not illustrated, and performs transmission of facsimile using a public telephone line network. Note that the facsimile communication unit 71 is an example of the other modules in the scope of claims.

The network interface unit 91 includes a communication module, such as a LAN board and the like, and transmits and receives various types of data to and from an external apparatus 200, such a personal computer and the like, in a local area or on the Internet via a LAN or the like coupled to the network interface unit 91. Note that the network interface unit 91 is an example of the other modules in the scope of claims.

The USB interface unit 92 is an interface circuit configured to perform communication with a communication terminal apparatus 300 via a USB cable (not illustrated) or the like. When the USB interface unit 92 and the communication terminal apparatus 300 are coupled with each other, the USB interface unit 92 performs mutual communication compliant with the USB standards with the communication terminal apparatus 300. Note that the USB interface unit 92 is an example of the other modules in the scope of claims.

The control unit 10 includes a central processing unit (CPU), a RAM, a ROM, a dedicated hardware circuit, and the like. The control unit 10 includes the main control unit 100, the nonvolatile memory 101, and the settable range detection unit 102.

The main control unit 100 performs overall operation control of the image forming apparatus 1. The main control unit 100 transmits a corresponding driving pulse signal to each of the scanner 5, the facsimile communication unit 71, the network interface unit 91, and the USB interface unit 92. Furthermore, the main control unit 100 controls the LCD control unit 470 (FIG. 3), and transmits an LCD clock signal to the LCD 473. The LCD clock signal is an example of the driving pulse signals in the scope of claims. Note that the main control unit 100 and the LCD control unit 470 (FIG. 3) are examples of the control unit in the scope of claims.

The nonvolatile memory 101 stores respective frequencies of EMI noise components in the driving pulse signals that are transmitted from the main control unit 100 to the other modules (the scanner 5, the facsimile communication unit 71, the network interface unit 91, and the USB interface unit 92) than the LCD 473 in association with the other modules. The nonvolatile memory 101 stores, as a data table, the frequencies of the EMI noise components corresponding to the other modules than the LCD 473. Note that the nonvolatile memory 101 is an example of an EMI frequency storage unit in the scope of claims.

The settable range detection unit 102 detects a settable range of the frequency of the LCD clock signal used for the LCD 473 from the LCD control unit 470 via the main control unit 100. The settable range detection unit 102 reads the settable range of the frequency of the LCD clock signal from a nonvolatile memory 472 (FIG. 3) in a state in which the operation unit 47 is coupled to the apparatus body 11.

In transmitting the LCD clock signal to the LCD 473, the main control unit 100 set, as the frequency of the LCD clock signal to the LCD 473, a frequency that is a frequency excluding the frequencies of the EMI noise components stored in the nonvolatile memory 101 in association with the other modules (the scanner 5, the facsimile communication unit 71, the network interface unit 91, and the USB interface unit 92) that are being driven and also is a frequency in the settable range which has been read from the nonvolatile memory 472 (FIG. 3) by the settable range detection unit 102.

The main control unit 100 is coupled to the control unit 10, the original document feeding unit 6, the scanner 5, the image forming unit 12, the image memory 32, the HDD 93, the fixing unit 13, the driving motor 70, the operation unit 47, the facsimile communication unit 71, the network interface unit 91, and the like, and performs control of each of the members.

The control unit 10 is caused to function as the main control unit 100 by an operation in accordance with an image processing program. However, the main control unit 100 may be configured by a hard circuit, not by an operation in accordance with the image processing program performed by the control unit 10. In the following description, the same applies to each embodiment, unless otherwise indicated.

FIG. 3 is a diagram illustrating how EMI noise is generated from each module. In FIG. 3, for convenience of explanation, the image forming apparatus 1 is illustrated such that the operation unit 47 and the apparatus body 11 are separated. The apparatus body 11 includes, in addition to the control unit 10, the scanner 5, the facsimile communication unit 71, the network interface unit 91, and the USB interface unit 92. Driving pulse signals are transmitted to these modules from the main control unit 100. The driving pulse signals include EMI noise components, and the EMI noise components are causes for the generation of EMI noise.

The operation unit 47 includes the LCD control unit 470 and the LCD 473.

The LCD control unit 470 is controlled by the main control unit 100, and includes an LCD controller 471 and the nonvolatile memory 472. The LCD controller 471 transmits the LCD clock signal, an LCD data signal, and the like to the LCD 473. Thus, an image is displayed on the LCD 473. The LCD clock signal includes EMI noise components, and the EMI noise components are causes for the generation of EMI noise.

The nonvolatile memory 472 stores the settable range (for example, 20 MHz to 40 MHz) of the frequency of the LCD clock signal used for the LCD 473 from the LCD controller 471 via the main control unit 100. Note that, for the frequency of the LCD clock signal, the settable range is determined in accordance with the number of pixels of the LCD 473. The nonvolatile memory 472 is an example of a settable range storage unit in the scope of claims.

Figure 4:
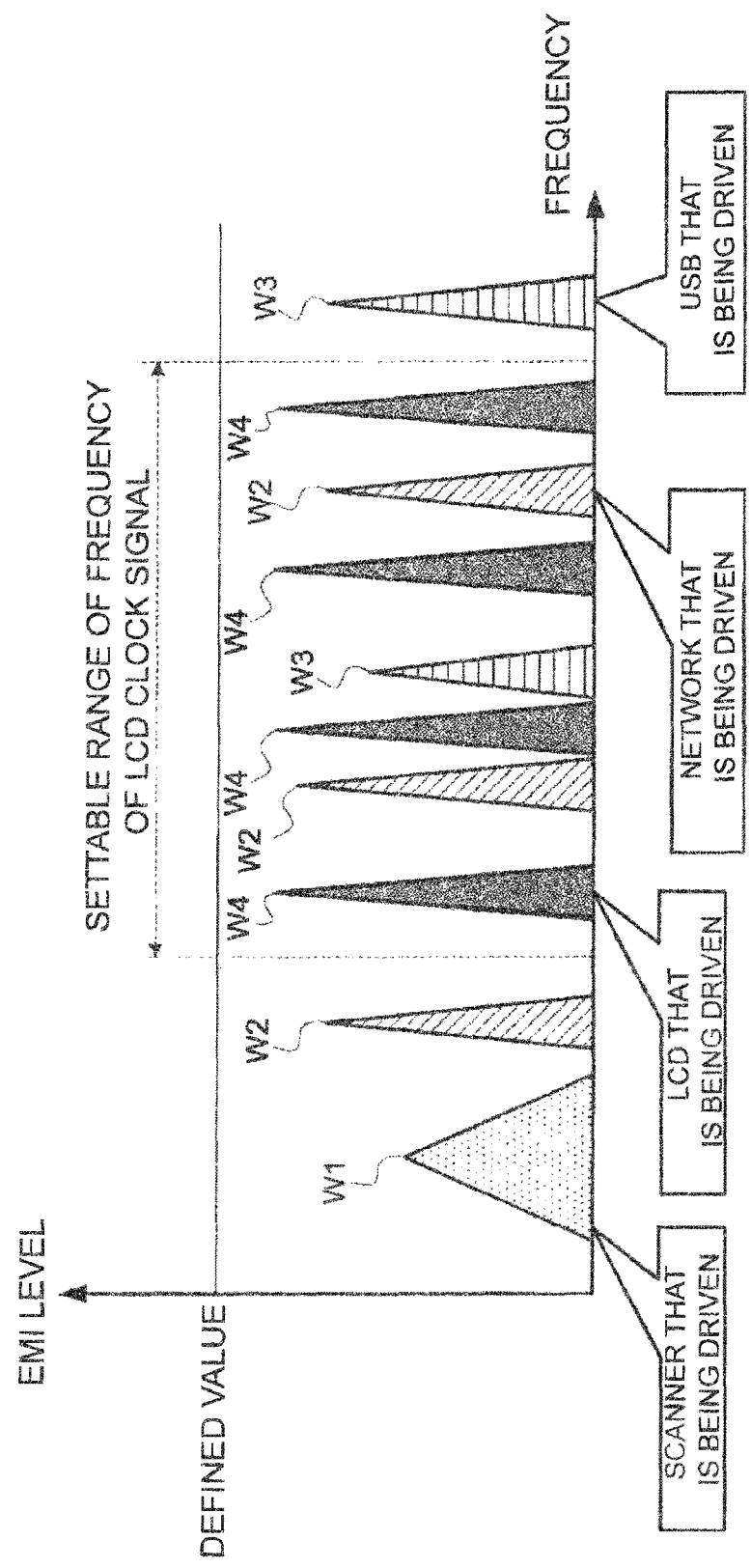
FIG. 4 is a graph of an example of a frequency spectrum representing the levels of EMI noise components included in the driving pulse signals that are transmitted to the modules, assuming that the abscissa axis indicates a frequency.

FIG. 4 is a graph of an example of a frequency spectrum representing the levels of EMI noise components included in the driving pulse signals that are transmitted to the modules, assuming that the abscissa axis indicates a frequency.

In FIG. 4, a triangle wave W1 indicates EMI noise components included in one of the driving pulse signals, which is transmitted to the scanner 5 by the main control unit 100, and a triangle wave W2 indicates EMI noise components included in one of the driving pulse signals, which is transmitted to the network interface unit 91 by the main control unit 100. Also, in FIG. 4, a triangle wave W3 indicates EMI noise components included in one of the driving pulse signals, which is transmitted to the USB interface unit 92 by the main control unit 100, and a triangle wave W4 indicates EMI noise components included in the LCD clock signal that is transmitted to the LCD 473 by the main control unit 100.

As indicated by the triangle waves W1 to W3, depending on which module is being driven, frequency bands in which EMI noise components are distributed differ. The levels of EMI noise components that are generated in the entire image forming apparatus 1 are needed to be defined values defined by the EMI standards, or lower values. The LCD 473 is driven at all times except when being in a sleep mode, and therefore, if the levels of the EMI noise components indicated by the triangle wave W4 are distributed in the same frequency band in which the levels of the EMI noise components indicated by the triangle waves W1 to W3 are distributed in an overlapping manner, each of the levels of the EMI noise components is added. Then, there is a probability that the levels of the EMI noise components that are generated in the entire image forming apparatus 1 exceeds the defined value.

In this embodiment, in transmitting the LCD clock signal to the LCD 473, for example, if the scanner 5 is being driven, the main control unit 100 sets, as the frequency of the LCD clock signal to the LCD 473, a frequency that is a frequency excluding the frequencies of the EMI noise components stored in the nonvolatile memory 101 in association with the scanner 5 that is being driven and also that is a frequency in the settable range read out from the nonvolatile memory 472 (FIG. 3) by the settable range detection unit 102.

Thus, as illustrated in FIG. 4, in the settable range of the frequency of the LCD clock signal, the frequency bands in which the triangle wave W1 (EMI noise components in one of the driving pulse signals, which is transmitted to the scanner 5) is distributed and the frequency bands in which the triangle wave W4 (EMI noise components in the LCD clock signal) is distributed may be caused to be different from each other. Note that, as the frequency of the LCD clock signal, a frequency that is different from the frequencies of EMI noise components in ones of the driving pulse signals, which are transmitted to the network interface unit 91 and the USB interface unit 92, similar to the scanner 5, is set.

Therefore, as illustrated in FIG. 4, each of the frequency bands in which the triangle wave W2 (EMI noise components in one of the driving pulse signals, which is transmitted to the network interface unit 91) is distributed and in which the triangle wave W3 (EMI noise components in one of the driving pulse signals, which is transmitted to the USB interface unit 92) is distributed is also different from the frequency bands in which the triangle wave W4 are distributed. That is, in FIG. 4, the frequency bands in which the triangle waves W1 to W3 are distributed are totally different from the frequency bands in which the triangle wave W4 are distributed. Therefore, the levels of the EMI noise components indicated by the triangle wave W4 are not added to the levels of the EMI noise components indicated by the triangle waves W1 to W3, and the levels of the EMI noise components in the entire image forming apparatus 1 does not exceed the defined value.

Also, in this embodiment, the nonvolatile memory 472 stores the settable range of the frequency of the LCD clock signal that is transmitted to the LCD 473 by the LCD controller 471, and therefore, the main control unit 100 may dynamically set the frequency of the LCD clock signal in the settable range in accordance with the other modules that are being driven.

Also, in this embodiment, the operation unit 47 is removably coupled to the apparatus body 11, and therefore, as long as the specifications of the apparatus body 11 and the operation unit 47 match, the operation unit 47 may be an operation unit of another type. In this respect, in this embodiment, the apparatus body 11 includes the main control unit 100, the nonvolatile memory 101, and the settable range detection unit 102, and the operation unit 47 includes the nonvolatile memory 472, so that, even when the operation unit 47 is replaced with an operation unit of another type, the settable range detection unit 102 may read out the settable range of the frequency of the LCD clock signal from an nonvolatile memory provided in the operation unit of another type in a state in which the operation unit of another type is coupled to the apparatus body 11. Therefore, the main control unit 100 may set, as the frequency of the LCD clock signal, a frequency that is in the settable range and excludes the frequencies of the EMI noise components stored in the nonvolatile memory 101 in association with the other modules that are being driven, and control in which EMI noise is reduced to the defined value or lower may be performed without difficulty.

Figure 5:
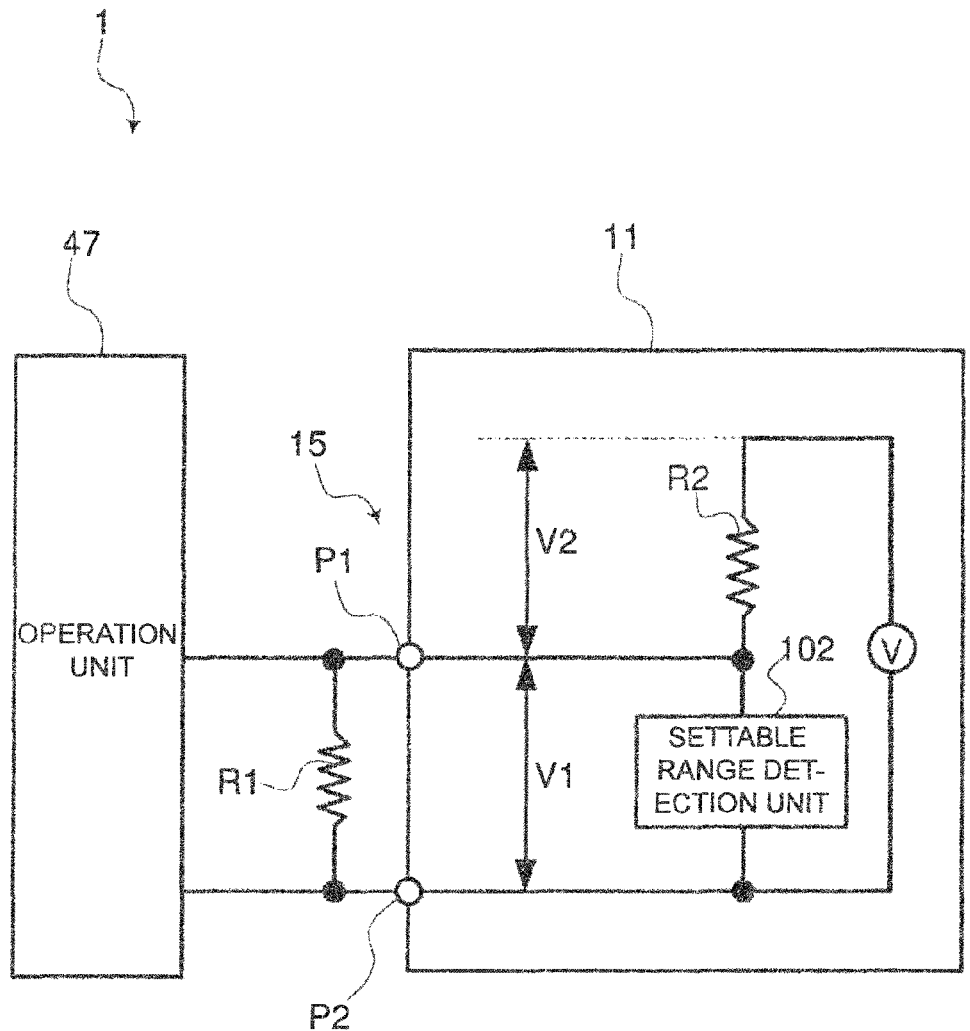
FIG. 5 is a diagram schematically illustrating an example of a state in which an apparatus body and an operation unit are coupled to each other.

In the description above, the nonvolatile memory 472 stores the settable range of the frequency of the LCD clock signal, but a method for storing the settable range is not limited thereto. FIG. 5 is a diagram schematically illustrating an example of a state in which the apparatus body 11 and the operation unit 47 are coupled to each other. In the image forming apparatus 1, the apparatus body 11 includes a voltage divider 15. The voltage divider 15 includes connection portions P1 and P2 to which, when the apparatus body 11 is coupled to the operation unit 47, one end and the other end of a resistor R1 having a unique resistance value for each device type in the operation unit 47 are coupled, respectively, and forms a circuit including the resistor R1 and a resistor R2 in a state in which the one end and the other end of the resistor R1 are coupled to the connection portions P1 and P2, respectively, thereby dividing a voltage value V that is determined in advance to divided voltage values V1 and V2. The settable range detection unit 102 has the settable range of the frequency of the LCD clock signal which is associated with each value of the divided voltage value V1. The settable range detection unit 102 is coupled to the connection portions P1 and P2, and detects the settable range of the frequency of the LCD clock signal which is associated with the detected divided voltage value V1 in a state in which the operation unit 47 is coupled to the apparatus body 11.

Note that the configurations and processing described in the above-described embodiment with reference to FIG. 1 to FIG. 5 are merely examples of the present disclosure and a configuration and processing according to the present disclosure are not limited thereto.

What is claimed is:

1. An electronic equipment comprising:
   a plurality of modules including a display module;
   a control unit configured to transmit a corresponding driving pulse signal to each of the plurality of modules;
   an EMI (electromagnetic interface) frequency storage unit configured to store respective frequencies of EMI noise components in ones of the driving pulse signals, which are transmitted from the control unit to the other modules than the display module in association with the other modules;
   a settable range detection unit configured to detect a settable range of the frequency of one of the driving pulse signals, which is transmitted from the control unit to the display module;
   an operation module including the display module; and
   an electronic equipment body including the control unit, the EMI frequency storage unit, and the settable detection unit and configured such that the operation module is removably coupled to the electronic equipment body,
   wherein
   when the control unit transmits the driving pulse signal to the display module, the control unit sets, as the frequency of the driving pulse signal to the display module, a frequency that is a frequency excluding the frequencies of the EMI noise components stored in association with the other modules that are being driven and also is a frequency in the settable range that has been detected,
   the electronic equipment body includes a voltage divider including a coupling portion to which, when the electronic equipment body is coupled to the operation module, a resistor having a unique resistance value for each device type in the operation module is coupled, and which is configured to divide, when the electronic equipment body is coupled to the operation module, a voltage value determined in advance by a connection with the resistor to divided voltage values, and
   the settable range detection unit is coupled to the coupling portion, and detects, as the settable range, a divided voltage value obtained by voltage division by the voltage divider in a state in which the operation module is coupled to the electronic equipment body.

2. An image forming apparatus that is the electronic equipment described in claim 1, comprising:
   an image forming unit configured to perform image forming on a recording medium,
   wherein
   each of the other modules is one of a scanner, a facsimile communication unit, a network interface unit, and a universal serial bus (USB) interface unit.

* * * * *